3,145,058
WHEEL COVER
Carl J. Demrick, Birmingham, Claude J. Marshall, Ypsilanti, and Victor A. Sanborn, Adrian, Mich., assignors, by mesne assignments, to Avis Industrial Corporation, Detroit, Mich., a corporation of Delaware
Filed July 13, 1961, Ser. No. 123,890
9 Claims. (Cl. 301—37)

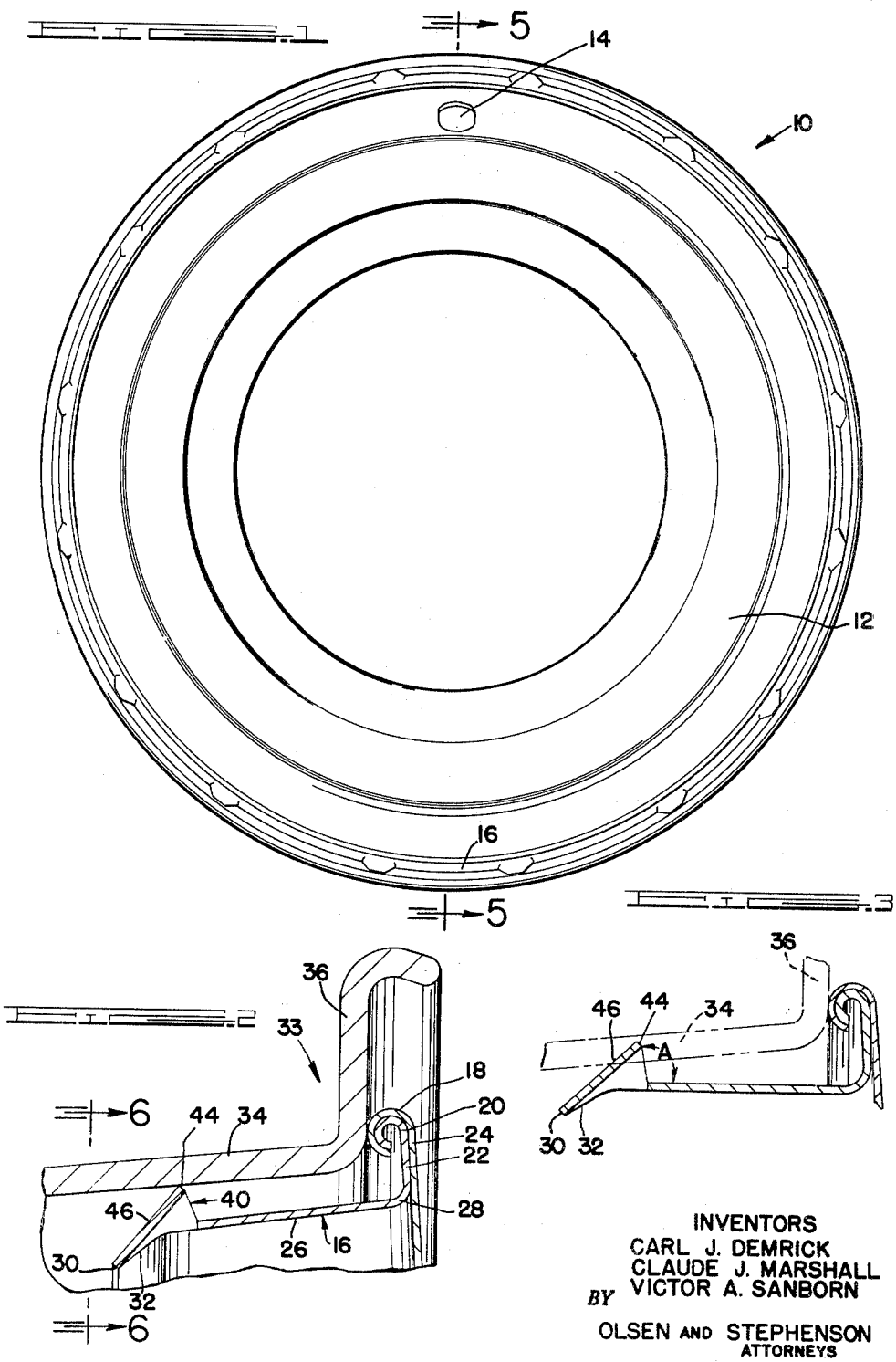

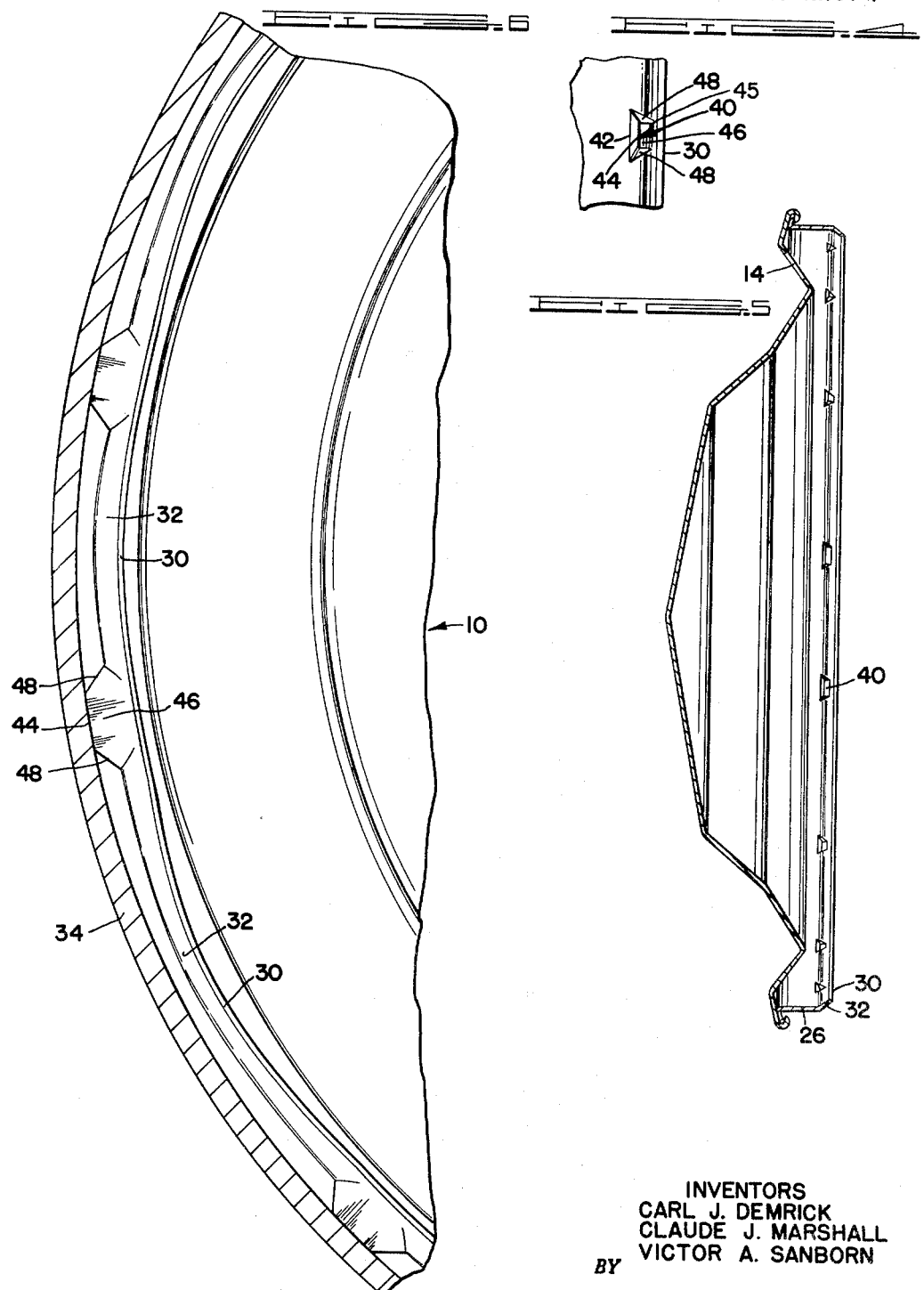

This invention relates generally to wheel covers and more particularly to a wheel cover having improved self-retention means for retaining it on a vehicle wheel to which it is applied.

It is an object of this invention to provide an improved wheel cover which can be easily applied by the usual manual pressure and which includes retaining teeth having gripping edges which bitingly engage a portion of the wheel rim to positively retain the cover in an applied position on the wheel.

Another object of this invention is to provide a wheel cover of this type in which the retaining teeth are formed on a flange on the cover which is sufficiently flexible to provide for the cover being readily pried free from the wheel without damage to the wheel or permanent set in the cover, and in which the flexible movement of the flange which occurs when the cover is installed, is utilized to maintain forces on the teeth urging them into cover retaining engagement with the wheel rim.

Still another object of this invention is to provide a wheel cover having a retention flange which is readily piloted into telescoping engagement with the wheel rim to thereby facilitate installation of the cover on the wheel.

A further object of this invention is to provide a wheel cover having retention teeth which are flexibly mounted on the cover so that during use of the cover no permanent set takes place in the retention teeth thereby enabling use of the cover over a prolonged service life without any significant reduction in the ability of the cover to retain itself on a wheel.

In general, the wheel cover of this invention is formed with a generally axially extending flange adapted to be telescoped into a portion of the wheel rim. The inner end portion of the flange is curved radially inwardly to stiffen it and to facilitate insertion of the flange into the wheel rim, and the outer end of the flange is secured to and extends at an angle relative to the cover body so that the flange can flex slightly radially inwardly and outwardly with respect to its outer end. A plurality of circumferentially spaced retaining teeth are punched or pressed out of the flange adjacent its inner end and each tooth is formed by lancing or cutting the flange and forcing a portion of the flange between its inner end and the cut radially outwardly to form a radially outwardly extending tooth having a gripping edge which faces the body of the cover. The gripping edges for the several teeth are disposed on a substantially circular path which extends about the flange and is of a diameter greater than the diameter of the annular wheel rim portion to which the cover is attached. As a result, when the flange is telescoped into the rim portion, the circumferentially spaced flange portions which are formed with the retention teeth flex radially inwardly about the outer end of the flange, and the portions of the flange between the tooth carrying portions flex radially outwardly and the curved inner ends of these portions tend to straighten out. The tendency of these flange portions between the teeth to resume their original shapes provides for the application of compressive forces on opposite sides of the tooth carrying portions of the flange which assist in maintaining the edges of the teeth in gripping engagement with the wheel rim. The flange must be sufficiently flexible to insure the radially outward bowing thereof between the teeth when the teeth are moved radially inwardly on engagement with the wheel rim in order to prevent permanent deformation of the flange. However, the flange must also be sufficiently stiff to prevent its bowing outwardly into engagement with the wheel rim for such engagement would relieve the retaining rim forces on the teeth. The inward curving of the inner end of the flange accomplishes this stiffening of the flange without significantly adding to the cost of the cover. The location of the teeth adjacent the inner end of the flange also facilitates piloting of the flange into the annular wheel rim portion, and the teeth are disposed at an angle relative to the rim which provides for an effective transfer of cover retaining forces from the rim to the teeth.

Further objects, features and advantages of this invention will become apparent from a consideration of the following description, the appended claims, and the accompanying drawing in which:

FIGURE 1 is a rear elevational view of the wheel cover of this invention;

FIGURE 2 is a fragmentary radial sectional view of portions of a vehicle wheel and the cover of this invention, illustrating the cover in assembly relation with the wheel;

FIGURE 3 is a radial sectional view of the cover of this invention showing the position of the cover retaining flange relative to the cover body before application of the cover to a wheel rim, which is shown in broken lines;

FIGURE 4 is an enlarged fragmentary perspective view of a portion of the cover of this invention having a retention tooth formed thereon;

FIGURE 5 is a transverse sectional view of the cover of this invention looking substantially along the line 5—5 of FIG. 1; and FIGURE 6 is a fragmentary sectional view of a wheel rim showing the cover of this invention applied thereto and looking substantially along the line 6—6 in FIG. 2.

With reference to the drawing, the wheel cover of this invention, indicated generally at 10, is illustrated in FIGS. 1 and 2 as including a circular body member 12, having an opening 14 through which the tire valve stem on a wheel to which the cover 10 is applied projects, and an annular cover mounting member 16 which is generally L-shape in cross section. A peripheral bead 18 (FIG. 2) formed on the body member or disc 12 is clamped about a similar but smaller annular bead 20 formed on one end of one leg 22 of the mounting member 16 to secure the mounting member 16 to the body member 12 so that the leg 22 is clamped against a substantially flat peripheral portion 24 of the body member 12 which is adjacent the bead 18. The other leg 26 of the mounting member 16 constitutes an annular flange which extends axially of the cover 10. For convenience of description, the end 28 of the flange 26, which is located at the juncture of the leg 22 and the flange 26, is hereinafter referred to as the "outer" or "forward" end of the flange 26 and the opposite end 30 is referred to as the "free edge" or the "inner" or "rearward" end of the flange 16 since, when the cover 10 is applied to a wheel, the ends 28 and 30 occupy these respective positions with respect to the outer or forward side of the wheel. The inner end portion 32 of the flange 26 is curved radially inwardly as shown in FIGS. 2, 3 and 5.

The cover 10 is adapted to be applied to a conventional vehicle wheel, such as an automobile wheel. Such a wheel includes a rim, an outer section of which is indicated at 33 in FIG. 2, having an annular portion 34 which is concentric with the wheel axis and is formed on the outer side of the wheel with a radially outwardly extending terminal flange 36. The rim portion 34 is of a decreasing diameter in a direction inwardly of the wheel from the flange 36, as shown in FIG. 2, and in the standard automobile wheel the rim portion 34 is inclined at an angle of about 5° relative to the wheel axis.

The cover 10 of this invention is self-retaining upon the wheel rim. In other words, the wheel does not have to be provided with any retention structure enabling the cover 10 to be retained thereon. For this purpose, the flange 26 is formed adjacent the inner end portion 32 with a plurality of circumferentially spaced retaining teeth 40 which project radially outwardly of the flange 26 for engagement with the rim portion 34. Each tooth 40 is formed by lancing the flange 26, so as to form an arcuate slit or cut 42 therein, and concurrently or subsequently deforming or punching a portion of the flange between the slit 42 and the flange inner end 30 radially outwardly so that the flange on the inner side of the slit 42 is bent outwardly so that it slopes radially and axially inwardly from the slit 42 into the curved flange inner end portion 32 so that it constitutes an outward continuation of the flange portion 32. Each tooth 40 is formed so that it has a side wall 46 which has a short edge 45 integral with curved inner edge portion 32 so that the side wall 46 extends into the curved inner end portion 32 of the flange 16 and is inclined radially outwardly in a direction toward the outer end 28 of the flange 26 and terminates in a biting or blunt short edge 44 which is spaced radially outwardly from the flange 26. The tooth 40 also has substantially triangular shaped end walls 48 which are inclined radially inwardly from opposite sides of the side wall 46 to join with the flange 26 on opposite sides of the tooth 40.

As shown in FIG. 1, the teeth 40 are formed in peripherally spaced portions of the flange 26 and as shown in FIG. 5 they are spaced a uniform distance from the inner end 30 of the flange 26. As a result, the gripping edges 44 of the teeth 40 are disposed on a substantially circular path which extends about the flange 26 and which is of a diameter greater than the diameter of the rim portion 34 engaged by the edges 44 when the cover 10 is installed, as shown in FIG. 3. The flange 26 is of a diameter slightly less than the diameter of the rim portion 34 into which it extends, as also shown in FIG. 3. Consequently, during telescoping of the flange 26 into the rim portion 34 from the outer side of the wheel, the edges 44 slide inwardly along the rim portion 34 and the radially inwardly directed forces exerted on the teeth 40 by the rim portion 34 causes the portions of the flange 26 which carry the teeth 40 to flex inwardly about the outer end 28 of the flange.

The portions of the flange between the portions formed with teeth 40, flex radially outwardly and it is essential that sufficient distance be provided between at least some of the teeth 40 to permit this outward flexing of the flange 26. Since the diameter of the inner end of flange 26, at the teeth 40, is decreased by the inward movement of the teeth 40, provision is made for an increase in the diameter of the flange 26 between the teeth 40 to thereby prevent any permanent deformation of the flange 26 and the teeth 40 as a result of the engagement of the teeth with the rim portion 34. Stated otherwise, the inner end portions of the flange 26 between the teeth 40 bow outwardly relative to their normal positions as shown in FIG. 6. As the portions of the flange 26 bow outwardly their inner end portions 32 also tend to straighten out, as shown in FIG. 6, so that some of the force which bow the portions of the flange 26 outwardly are absorbed in straightening out the end portion 32. Thus the inward curvature of the flange portion 32 adds to the stiffness of the flange 26, and the tendency of the flange portion 32 to resume its normal curvature adds to the forces which hold the edges 44 in engagement with the wheel rim portion 34.

As shown in FIG. 1, the teeth 40 are arranged in pairs and the outwardly flexing flange portions are those portions between adjacent pairs of teeth 40. In the illustrated embodiment of the invention, sufficient spacing of the teeth in each pair is provided to also permit some outward flexing of the portions of the flange 26 between the teeth 40 of each pair. However, this is not regarded as essential so long as there is sufficient distance between adjacent pairs of teeth 40 to provide for outward flexing of the flange 26 and this distance is small enough to prevent the flange from bowing into contact with the rim or acquiring a permanent bow.

It is also within the purview of this invention to arrange the teeth 40 singly instead of in pairs. As the number of teeth 40 is decreased the extent of interference of the rim portion 34 to accidental removal of the cover 10 is decreased and the danger that the distance between adjacent teeth 40 will be too large is increased. Conversely, as the number of teeth 40 is increased, so that the spacing between adjacent teeth 40 is decreased, the ability of the flange 26 to flex radially outwardly between the teeth 40 is decreased so that while increased interference is obtained the possibility of permanent deformation of the flange 26 and the teeth 40 is increased. In the preferred embodiment of the invention, therefore, the teeth 40 are arranged in eight pairs, with the teeth in each pair being arranged so that as shown in FIG. 1, the teeth 40 are arranged so that the space therebetween is less than the space between adjacent pairs, as shown in FIGS. 1 and 6. This arrangement provides the necessary number of teeth 40 to obtain the desired interference while still providing the desired spacing between some teeth to provide for the outward flexing of the flange 26 to prevent permanent deformation of the flange and the teeth 40.

When the flange 26 has been fully telescoped into the rim portion 34 to a position in which the cover bead 18 engages the rim flange 36 (FIG. 2), the gripping edge 44 of each tooth 40 is urged into biting engagement with the rim 34 by the tendency of the resilient flange portions which carry the teeth 40 to flex radially outwardly to their unstressed position shown in FIG. 3. Also, the radially outwardly flexed portions of the flange 26 located between adjacent pairs of teeth 40 tend to resume their unstressed positions and thus exert compressive forces acting inwardly from opposite sides of each tooth 40 to further urge it into engagement with the rim portion 34. As a result, each tooth 40 is firmly maintained in a position in which its gripping edge 44 bitingly engages the rim portion 34. Consequently, the cover 10 is firmly retained upon the wheel rim portion 34.

As shown in FIG. 3, each tooth side wall 46 extends into the adjacent flange end portion 32 so that the end of the side wall 46 remote from the edge 44 forms a part of the flange end portion 32. By virtue of this placement of the teeth 40 a "rocking or pivoting" action is obtained tending to hold the cover 10 in a retained position on a wheel rim, since the teeth 40 can to a limited extent pivot relative to their biting edges 44. In the event a portion of the cover is temporarily subjected to a force which tends to move it axially outwardly of the wheel rim, the flange portion 32 adjacent a tooth 40 can flex radially inwardly with the adjacent tooth 40 pivoting or swinging about its edge 44. As soon as the force is relieved, the flange end portion 32 resumes its original shape and the tooth 40 pivots back to its original position so as to rock or pivot the bead 18 back against the rim flange 36, without any reduction in the retention capacity of the teeth 40.

It has been found that the retention forces exerted on the rim portion 34 by the teeth 40 are increased by forming the teeth 40 so that the angle between the flange 26 and each tooth side wall 46, indicated at A in FIG. 3, is greater than 45° and less than 90°. In a preferred embodiment of the invention this angle is about 50°. By maintaining the angle between these limits the danger of accidental slippage between the rim portion 34 and the teeth 40 permitting accidental removal of the cover 10 are reduced to a minimum.

From an economy standpoint it is desirable that the cover 10 be made from as inexpensive metal as practical. However, the material utilized for forming the cover 10 must lend itself easily to a commercially acceptable finish and the flange 26 must be of a sufficiently flexible metal to permit flexing of the flange about its inner end 28 and flexing of the flange end portion 32 described above. The material preferred for this purpose is a chrome nickel alloy stainless steel, although it is apparent that other materials could be satisfactorily employed.

From the above description it is seen that this invention provides an improved wheel cover 10 which is formed with retention teeth 40 that are readily punched or pressed out of the flange 26 and which are effective to maintain the cover 10 in an applied position on a vehicle wheel so that the cover 10 cannot be accidentally removed. The location of the teeth 40 adjacent the inner end of the flange 26, which is provided with the radially inwardly curved portion 32 to facilitate its being telescoped into the rim portion 34, facilitates piloting of the flange 26 into the rim portion 34. By virtue of the taper of the wheel rim portion 34 the teeth 40 can be disposed on a diameter of the flange 26 such that the teeth 40 may be moved into the large end of the rim portion 34, adjacent the flange 36, without substantial interference from the rim portion 34. As the teeth 40 are forced axially into the rim portion 34, the decreasing diameter of the rim portion 34 provides for the desired interference. The utilization of the flexibility of the flange 26 to maintain the teeth 40 in gripping engagement with the rim portion 34 also provides for an attachment of the cover 10 to the wheel so that the cover can readily be pried off the wheel. While the body member 12 and the mounting member 16 have been illustrated as separate parts secured together by the beads 18 and 20 it is apparent that they can be satisfactorily formed as a single integral part.

It will be understood that the wheel cover which is herein disclosed and described is presented for purposes of explanation and illustration and is not intended to indicate limits of the invention, the scope of which is defined by the following claims.

What is claimed is:

1. In a wheel structure which has an annular axially extending rim portion, a circular wheel cover having a disc and a continuous axially extending annular flange of a diameter less than the diameter of said rim portion for telescoping nested engagement within said rim portion, said flange having an outer end secured to said disc and an inner end spaced from said disc and being formed for radial flexing movement with respect to said outer end, and a plurality of cover retaining teeth pressed from peripherally spaced portions of said flange, each of said teeth forming integral continuations of said flange in a circumferential direction and being inclined radially outwardly in a direction toward said flange outer end and terminating in an elongated retaining edge adapted to grippingly engage said rim portion, said retaining edges being located along a substantially circular path extending about said flange, said path being of a diameter sufficiently greater than the diameter of said rim portion such that telescoping of said flange into said rim portion effects a radially inwardly flexing movement of the portions of said flange formed with said retaining teeth, said teeth being arranged in a spaced apart relation such that the distance between at least some of said teeth is sufficient to provide for a radially outward flexing movement of the portions of said flange between said some teeth when said teeth are in gripping engagement with said rim portion.

2. A circular wheel cover for a wheel which has an annular axially extending rim portion which extends axially inwardly from one side of said wheel, said cover including a circular body member having a continuous axially extending annular flange of a diameter less than the diameter of said rim portion for telescoping nested engagement within said rim portion to a position in which said body member engages said one side of said wheel, said flange having an outer end located adjacent said body member and a radially inwardly curved inner end portion spaced from said body member and being formed for radial flexing movement with respect to said outer end, and a plurality of cover retaining teeth pressed from peripherally spaced portions of said flange adjacent said inner end portion thereof, each of said teeth including a wall which forms an axially outward continuation of said flange inner end portion and is inclined radially and axially outwardly and terminates in a retaining edge adapted to grippingly engage said rim portion, said retaining edges being located along a substantially circular path extending about said flange, said path being of a diameter sufficiently greater than the diameter of said rim portion such that telescoping of said flange into said rim portion effects a radially inwardly flexing movement of the portions of said flange formed with said retaining teeth.

3. A circular wheel cover for a wheel which has an annular axially extending rim portion which extends axially inwardly from one side of said wheel, said cover including a circular body member having a continuous axially extending annular flange of a diameter less than the diameter of said rim portion for telescoping nested engagement within said rim portion to a position in which said body member engages said one side of said wheel, said flange having an outer end located adjacent said body member and a radially inwardly curved inner end portion spaced from said body member and being formed for radial flexing movement with respect to said outer end, and a plurality of cover retaining teeth pressed from peripherally spaced portions of said flange adjacent said inner end portion thereof, each of said teeth including a wall which forms an axially outward continuation of said flange inner end portion and is inclined radially and axially outwardly and terminates in a retaining edge adapted to grippingly engage said rim portion, each of said teeth being inclined relative to said flange so that the included angle therebetween is greater than 45° and less than 90°, said retaining edges being located along a substantially circular path extending about said flange, said path being of a diameter sufficiently greater than the diameter of said rim portion such that telescoping of said flange into said rim portion effects a radially inwardly flexing movement of the portions of said flange formed with said retaining teeth.

4. A circular wheel cover for a wheel which has an annular axially extending rim portion which extends axially inwardly from one side of said wheel, said cover including a circular body member having a front side and a rear side and an annular mounting member of a generally L-shape in cross section, said mounting member having a first portion secured to the rear side of said body member adjacent the periphery thereof and a flange portion which extends substantially axially rearwardly of said body member from the radially inner edge of said first member, said flange being radially flexible with respect to the inner edge of said first member and having a radially inwardly curved inner end portion, said annular flange being of a diameter less than the diameter of said rim portion for telescoping nested engagement within said rim portion, and a plurality of cover retaining teeth pressed from peripherally spaced portions of said flange adjacent said inner end portion thereof, each of said teeth including a side wall which is inclined radially and axially outwardly from said flange inner end portion and terminates in a substantially straight retaining edge adapted to grippingly engage said rim portion, each of said teeth having end walls which extend radially inwardly from opposite sides of said side wall and are integral with said flange, said retaining edges being located along a substantially circular path extending about said flange, said path being of a diameter sufficiently greater than the diameter of said rim portion such that telescoping of said flange into said rim portion effects a radially inwardly flexing movement of the portions of said flange formed with said retaining teeth and a radially outward flexing movement of the portions of said flange between at least some of said teeth.

5. In a wheel cover comprising a disc having an integral, annular, axially and rearwardly directed free edge flange, having spaced apart, struck-out teeth near the free edge of the flange; said teeth each comprising an elongated rectangular shaped flat central portion having one short edge integral with and adjacent to the free edge of the flange, said central portion being sloped outwardly and forwardly at an acute angle relative to the flange, with the opposite short edge being outwardly spaced from the flange and forming a blunt edge of the tooth, and with the two long edges of the central portion each being connected to the flange by a flat triangular shaped side portion, each having three leg forming edges, with one of said three legs formed by its adjacent rectangular portion long edge, another of said three legs being integral with the flange and the third of said legs being severed from the flange and sloping from said central portion opposite short edge to the flange.

6. A wheel cover comprising a circular member having an integral, annular, axially and rearwardly directed free edge flange with spaced apart, struck out teeth near the free edge of the flange, said teeth each comprising a flat central portion having one end integral with and adjacent to the free edge of the flange, said central portion being sloped radially outwardly and axially forwardly at an acute angle relative to the flange with the opposite end of the flat central portion being radially outwardly spaced from the flange and forming a straight circumferentially aligned blunt edge of the tooth, and with the opposite side edges of the central portion each being connected to the flange by a flat triangular shaped side portion, each side portion having three leg forming edges, with one of said three legs formed by its adjacent flat portion side edge, another of said three legs being integral with said flange and the third of said legs being severed from said flange and sloping from said opposite edge to said flange.

7. A wheel cover as claimed in claim 6 wherein pluralities of said teeth are arranged together, the circumferential spacing of the teeth in each of said pluralities being less than the circumferentially spacing between adjacent ones of said pluralities.

8. A wheel cover as claimed in claim 7 wherein the free edge of said flange adjacent each of said pluralities is bent out of the surface of said flange to rigidify the latter.

9. A wheel cover as claimed in claim 8 wherein said free edge is bent inwardly at an angle corresponding to the slope of the central portion so as to lie substantially within the plane of each adjacent tooth central portion.

References Cited in the file of this patent

UNITED STATES PATENTS

| | | |
|---|---|---|
| 2,607,633 | Lyon | Aug. 19, 1952 |
| 2,660,478 | Lyon | Nov. 24, 1953 |
| 2,669,487 | Horn | Feb. 16, 1954 |
| 2,698,203 | Landell | Dec. 28, 1954 |
| 2,911,258 | Lyon | Nov. 3, 1959 |
| 2,939,743 | Lyon | June 7, 1960 |

FOREIGN PATENTS

| | | |
|---|---|---|
| 564,740 | Canada | Oct. 14, 1958 |